Feb. 11, 1964     M. MILEWSKI ETAL     3,120,725
PRECISION WORK HOLDER
Filed April 10, 1962

INVENTORS
Milton Milewski
Joseph J. Caggianello
BY Arthur F. Fattibene
ATTORNEY

United States Patent Office 3,120,725
Patented Feb. 11, 1964

3,120,725
PRECISION WORK HOLDER
Milton Milewski, 225 Nassau Road, Stratford, Conn., and Joseph J. Caggianello, 46 Stephnie Circle, Trumbull, Conn.
Filed Apr. 10, 1962, Ser. No. 186,522
2 Claims. (Cl. 51—237)

This invention relates in general to a work holder for doing precision work, and more specifically to a work holder for positioning and maintaining the axis of the work piece in a predetermined position with respect to a machining or grinding tool operating thereon.

Heretofore, work holders belonging to the class of the type to be herein described have been usually characterized by certain inherent disadvantages, chief among which was the inability of the known work holder to be finely adjusted to insure true parallel grinding or cutting of a work piece, or conversely for introducing a very fine taper into the work piece, if desired. Heretofore very fine adjustments of the work piece held in a work holder were usually attained by shimming the work holder to properly position the work piece with respect to an operating tool. This method of attaining the fine adjustments desired in a precision operation was at best a crude trial and error method, and further one which required the skill of a machinist having many years of experience.

Therefore an object of this invention is to provide a work holder having novel means for making very fine adjustments in positioning and maintaining the axis of a work piece with respect to a machining or grinding tool operating thereon for performing either precision parallel grinding or machining of the work piece, or for conversely introducing a slight taper therein as may be desired.

Another object is to provide for work holder having a pair of oppositely disposed centers for supporting a work piece therebetween, and which centers are rendered readily adjustable with respect to one another for making slight adjustments in the position of the central axis of the work piece with respect to the tool operating thereon.

Another object is to provide an improved work holder constructed and arranged to effect ready removal or interchange of centers without disturbing the setting of the work piece with respect to the tool operating thereon.

Still another object is to provide a work holder with relatively adjustable centers that are relatively simple in construction, relatively inexpensive to fabricate, and which is expedient and positive in operation.

The above objects and other features and advantages of this invention are attained by a work holder comprising essentially of head stock and tail stock adjustably mounted on a sine plate which hingedly connects with a base plate for effecting angular settings. In accordance with this invention, a plunger type center is mounted in the head stock, and a cooperating center is mounted in the tail stock for supporting therebetween a work piece. Means for rotating the work piece between centers is provided in the head stock. To effect fine or vernier adjustment of the work piece with respect to a cutting or grinding tool, means are provided for angularly adjusting one center with respect to the other. In accordance with this invention, this is attained by supporting the angularly adjustable center in an eccentric bushing or sleeve. A graduated index or dial is connected to the bushing so that accurate adjustments can be consistenetly attained by rotation of the dial accordingly.

Therefore, a feature of this invention resides in the provision of angularly adjusting one of the centers of a work holder with respect to the other center so as to effect a fine adjustment of the work piece with respect to a cutting or grinding tool.

Another feature of the invention resides in the provision means for effecting angular adjustment of the center relative to the other by mounting the adjustable center in an eccentric bushing or sleeve rotatably supported within the tail stock.

Still another feature resides in the provision of a graduated or scaled dial or index operatively connected with the eccentric bushing to effect precise angular adjustment of the center relative to the other center.

Other features and advantages will become more readily apparent when considered in view of the drawings and following description in which.

Figure 2:
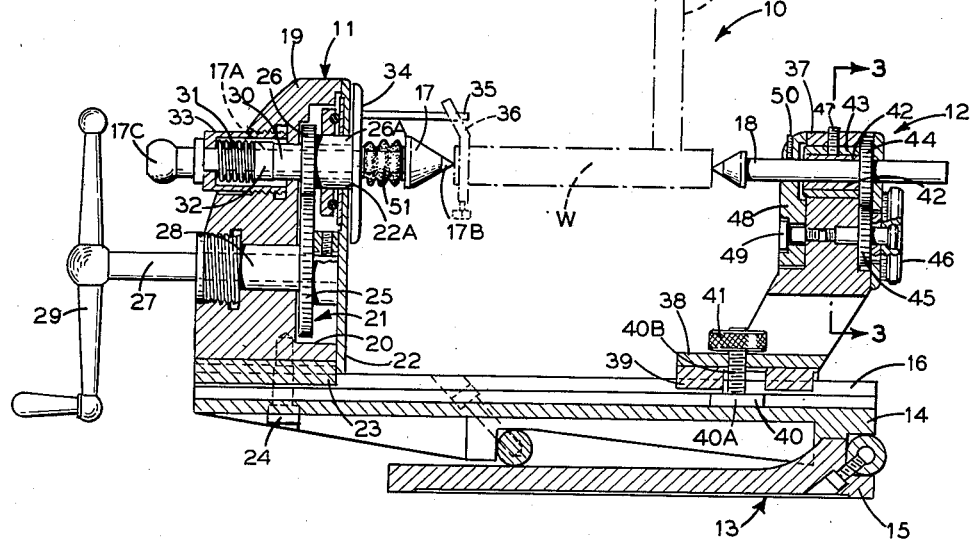
FIG. 2 is a sectional side elevation view of the work holder.

Referring to the drawing there is illustrated the improved work holder 10 of this invention. In the illustrated embodiment, the work holder 10 is shown as utilized for holding a work piece W for performing cylindrical grinding on a surface grinder. However, it will be understood that the inventive concept to be herein described need not be limited thereto as it has application in any machining operation on a rotating work piece as for example in a lathe or the like.

With particular reference to the illustrated embodiment, the work holder 10 comprises essentially of a head stock 11, a tail stock 12 and a base means 13 on which the head stock 11 and tail stock 12 are carried. Accordingly, the base means 13 comprises a sine plate 14 hingedly connected at one end to a base plate 15. Extending longitudinally of the since plate 14 is a T-shaped groove or recess 16 in which the respective head stock 11 and tail stock 12 are rendered slidably adjusted with respect to one another. Thus the linear distance between centers 17 and 18 carried by the respective stocks 11 and 12 can be adjusted to accommodate varying lengths of work piece W. Also, with the construction illustrated, the position of the head stock 11 and tail stock 12 are rendered readily reversible, i.e. the position of the head stock 11 can be interchanged with that of the tail stock 12.

The head stock 11 comprises a housing or casting 19 which is formed with a cavity or recess 20 in one end thereof for accommodating the drive mechanism 21 to be described. Covering the recess 20 is a cover plate 22. A key or way 23 formed in the bottom of the housing is receivable in T slot 16 to position the housing 19 in the groove 16 of the sine plate; and lock screw 24 extending through the sine plate 14 and threaded into the housing 19 secures the housing 19 with respect to the sine plate 14.

Mounted in meshing relationship within the recess 20 is a driving gear 25 and a driven gear 26. Accordingly, the driving gear 25 is fixed to a shaft 27 extending transversely through the housing 19 and which is rotatably journaled in a suitable wear bushing 28. Connected to the extended end of the shaft 27 is a suitable handle means 29 by which the shaft 27 and connected driving gear 25 is rotated.

The driven gear 26 in meshing relationship with the driving gear 25 is provided with a sleeve hub 26A which extends through an align opening 22A in the cover plate 22. Extending through the sleeve hub 26A of the gear 26 is shaft 17A of the front center 17. As shown, the front center 17 is reciprocally mounted in a suitable wear bushing 30 and is normally urged toward operative projected position by a spring 31 anchored between a collar 32 fixed to the center 17 and the retaining cap 33 screwed to the housing 19 to retain the center 17 in position therein. The center 17 is provided with a conical tip 17B for engaging a work piece W on its inner end and with a pull knob 17C connected to the outer end thereof to facilitate retraction thereof against the force of spring 31.

Fixed to the sleeve hub 26A of the driven gear 26 which extends beyond the cover plate 22 is a driving plate 34 and eccentrically connected to the driving plate 34 and extending forwardly thereof is a driving pin 35 for engaging the driving dog 36 which is clamped to the work piece W supported between centers 17 and 18.

The tail stock 12 comprises a housing 37 having a bifurcated lower portion with a bottom plate 38 connected therebetween. The bottom plate 38 is formed with a key or way 39 receivable in T slot 16 and by which the tail stock 12 is guided longitudinally of the sine plate 14. A T-bolt 40 having an enlarged head 40A slidably positioned within the T slot 16 and having a threaded stem 40B projecting through the bottom plate 38 fixes the tail stock 12 in position by tightening the nut 41 threaded to stem 40B.

Figure 3:
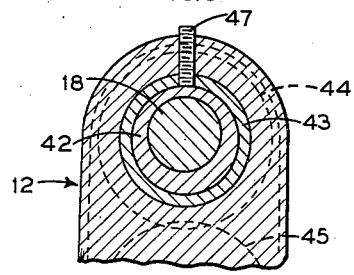
FIG. 3 is a section view taken along line 3—3 of FIG. 2.
Figure 1:
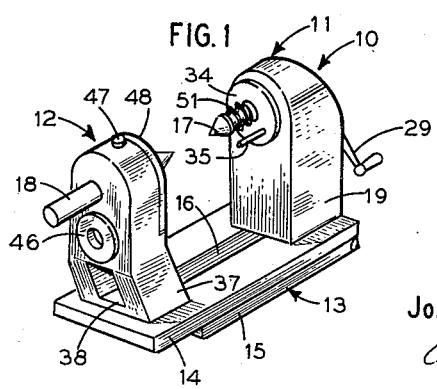
FIG. 1 is a perspective view of the work holder of this invention.

In accordance with this invention, the rear center 18 is mounted within the tail stock 12 so as to be angularly adjusted with respect to the front center 17. This is attained by mounting the rear center 18 within an eccentric sleeve or bushing 42 which is rotatably journaled in a suitable wear bushing 43 extending transversely of the tail stock. Thus, as best seen in FIG. 3, rotation of the eccentric bushing 42 will angularly position the rear center 18 with respect to the fixed tip 17B of the front center 17.

To effect a measurable degree of rotation and angular adjustment of the eccentric bushing 42 and center 18 carried thereby, a gear 44 is fixed to the eccentric bushing 42. Meshing with gear 44 is a second or driving gear 45 to which a scaled dial 46 is fixed. Thus by rotating the scaled dial 46 a given amount, the bushing 42 and center 18 carried thereby is rotated a given amount. In the instant case, the gears 44 and 45 are formed with a 1 to 1 ratio.

To fix the eccentric bushing 42 in its adjusted position, a set screw 47 is provided. Thus by threading the screw 47 so that it bears against the outer surface of the eccentric bearing 42 will insure the maintenance thereof in the adjusted position.

As shown, the rear center 18 projects through a dog plate 48 which is secured for relative movement with respect to the tail stock 12 by a bolt 49. As shown, a clearance is provided between the dog plate 48 and its holding bolt 49 so that the dog plate 48 is free to ride with the center 18. A set screw 50 is provided to lock the center 18 to the dog plate 48 and thereby prevent relative movement of the center 18 with respect to the tail stock 12.

In the arrangement described, it will be readily apparent that the rear center 18 can be readily removed without the disturbance of the desired setting of eccentric 42. This is readily attained by locking the eccentric bushing 42 with its set screw 47 and loosening set screw 50 to permit removal of center 18 from the tail stock 12. Thus center 18 can be readily removed or interchanged without loosening the established eccentricity.

As shown, a work piece W having its centers located on its ends is supported between centers 17 and 18. A dog 36 is clamped to one end of the work piece W and in operation rotation of the handle will effect the engagement of drive pin 35 with dog clamp 36 to effect rotation of the work piece.

To minimize the entrance of dust particles into drive mechanism 21, a rubber boot or shield 51 is fitted about the shaft 17A of the front center 17 between the conical tip 17B and the dow plate 34. As shown, the boot 51 is provided with accordian folds to permit compression thereof when the center 17 is pulled to the rear to release a work piece W.

In operation, the work holder 10 with a work piece supported between centers 17 and 18 is positioned with respect to the operating tool, as for example a surface grinder 52. To effect accurate cylindrical grinding, for example, it is essential that the axis of the work piece W be disposed normal to the plane of the grinding wheel. In accordance with this invention, the precision with which the central axis of the work piece is positioned with respect to the perpendicular plane of the surface grinder 52 can be greatly enhanced by effecting the very fine corrective angular adjustment afforded by the eccentric mounting of rear center 18. Thus, the construction described may be used with equal facility to perform parallel grinding or machining of a work piece by adjusting the center 18 to correct for taper due to misalignment of the central axis of the work piece with respect to the plane of the operating tool, or if desired may be adjusted to effect intentional misalignment therebetween to form a taper in a work piece.

For the foregoing description, it will be apparent that angular adjustment of one center relative to the other by the utilization of an eccentric bushing rotatably journaled in one of the stocks provides a relatively simple and positive means for effecting vernier adjustment of the central axis of work piece with respect to a tool operating thereon.

While we have therein shown and described the preferred embodiment of the present invention and have suggested various modifications therein, it will be understood that other changes and modifications may be made therein within the scope of the appended claims without departing from the spirit and scope of this invention.

What we claim is:

1. A precision work holder for holding and rotating a work piece with respect to a cutting or abrading tool adapted to operate on said work piece and comprising a base plate, a sine plate pivotally connected at one end to said base plate; said sine plate having a longitudinally extending slot formed therein, a head stock and a tail stock adjustably supported on said sine plate within said slot, lock means for maintaining each of said tail stock and head stock fixed relative to each other and to said sine plate, said head stock including a head stock housing a hollow stationary bearing sleeve horizontally disposed within said housing, a driving gear rotatably mounted within said housing below said sleeve, a manually operated handle means for actuating said driving gear, a driven gear in meshing relationship with said driving gear, a drive plate connected to said driven gear to rotate upon actuation of said meshing gears, said drive plate having a central opening in alignment with said sleeve, a front dead center having a shaft reciprocally mounted in said sleeve and the opening in said driving plate, said front dead center having a conical tip end forming the front support for a work piece, said tip end having a base diameter greater than said shaft, a pull knob connected to the other end of said shaft, a spring means engaging the base of said tip normally urging said front dead center outwardly of said driving plate, a flexible boot covering the portions of the front dead center between the tip end and said drive plate, and said tail stock including a rear center mounted therein for angular adjustment with respect to said front center, and means for the angular adjustment of same.

2. A work holder for precisely holding and rotating a work piece with respect to a cutting or abrading tool adapted to operate on said work piece and comprising a base plate, a sine plate pivotally connected at one end to said base plate; said sine plate having a longitudinally extending T slot formed therein, a head stock and a tail stock adjustably supported on said sine plate within said slot, lock means for maintaining each of said tail stock and head stock in fixed adjusted relationship relative to each other and to said sine plate, said head stock including a head stock housing, a hollow stationary bearing sleeve horizontally disposed within said housing, a driving gear rotatably mounted within said housing below said sleeve, a manually operated handle means for actuating said driving gear, a driven gear rotatably mounted on said stationary bearing sleeve in meshing relationship with said driving gear, a drive plate connected to said driven gear to rotate upon actuation of said meshing gears, said drive plate having a central opening disposed in alignment with said stationary sleeve, a front dead center having a shaft portion projecting through said sleeve and the opening in said driving plate, said front center having a conical head connected to said shaft portion with its tip end forming the front support for a work piece, said conical tip having a base end which is greater than the shaft portion of said center, a pull knob connected to the other end of the center, a spring means disposed between said driving plate and base end of said tip normally urging said center outwardly of said driving plate, a flexible boot covering the portions of the front center between the conical tip end and said drive plate, and said tail stock including tail stock housing having a horizontally extending bore therein, a hollow wear bushing fitted in said bore, an eccentric bushing fitted in said wear bushing for rotation relative thereto, a gear connected to said eccentric bushing for effecting rotation thereof, a rear dead center carried in said eccentric bushing for rotation therewith to provide for relative angular adjustment thereof, means for effecting rotation of said gear and connected eccentric bushing, said latter means including a driving gear meshing with said eccentric bushing gear, and a graduate dial connected to said driving gear whereby the eccentricity of said rear center relative to the front center can be adjusted by rotation of said eccentric bushing and rear center fitted thereto, and means for locking said eccentric bushing in adjusted position.

References Cited in the file of this patent

UNITED STATES PATENTS

| | | |
|---|---|---|
| 1,739,753 | Flanders | Dec. 17, 1929 |
| 2,116,135 | Bath | May 3, 1938 |
| 2,390,627 | Truba | Dec. 11, 1945 |
| 2,706,872 | Flanders et al. | Apr. 26, 1955 |
| 2,746,218 | Bowie et al. | May 22, 1956 |
| 2,954,651 | Gebhart | Oct. 4, 1960 |
| 2,990,654 | McEwan | July 4, 1961 |

FOREIGN PATENTS

| | | |
|---|---|---|
| 489,546 | France | Oct. 12, 1918 |
| 915,404 | Germany | July 22, 1951 |
| 1,145,484 | France | May 6, 1959 |